United States Patent
Pursey et al.

(10) Patent No.: US 11,753,141 B2
(45) Date of Patent: Sep. 12, 2023

(54) METHODS AND ASSEMBLIES FOR MOUNTING EQUIPMENT TO AN AIRCRAFT FUSELAGE

(71) Applicant: Raytheon Systems Limited, Marlow (GB)

(72) Inventors: Andrew Giles Pursey, Harlow (GB); Laurence Baron, Harlow (GB)

(73) Assignee: Raytheon Systems Limited, Glenrothes (GB)

( * ) Notice: Subject to any disclaimer, the term of this patent is extended or adjusted under 35 U.S.C. 154(b) by 394 days.

(21) Appl. No.: 16/897,890

(22) Filed: Jun. 10, 2020

(65) Prior Publication Data

US 2020/0385147 A1    Dec. 10, 2020

(51) Int. Cl.
*B64C 7/00* (2006.01)
*B64D 45/02* (2006.01)
*B64C 1/06* (2006.01)

(52) U.S. Cl.
CPC ............... *B64C 7/00* (2013.01); *B64C 1/061* (2013.01); *B64D 45/02* (2013.01)

(58) Field of Classification Search
CPC ............... B64C 1/22; B64C 7/00; B64D 9/00
See application file for complete search history.

(56) References Cited

U.S. PATENT DOCUMENTS 2,700,104 A    1/1955 Bowman
3,613,098 A    10/1971 Blasko
(Continued)

FOREIGN PATENT DOCUMENTS

CN    109305323 A    2/2019
EP    753458 A1 *    1/1997    ............... B64C 7/00
(Continued)

OTHER PUBLICATIONS

Response to U.S. Non-Final Office Action dated Jan. 13, 2022 for U.S. Appl. No. 16/897,876; Response filed Mar. 1, 2022; 27 Pages.
(Continued)

*Primary Examiner* — Timothy D Collins
*Assistant Examiner* — Eric Acosta
(74) *Attorney, Agent, or Firm* — DALY, CROWLEY, MOFFORD & DURKEE, LLP (57) ABSTRACT

There is provided a method of mounting equipment to an aircraft. The method comprises attaching a mounting structure to the fuselage of the aircraft, the fuselage extending lengthwise along a longitudinal axis. This comprises irremovably attaching a plurality of substantially planar frames to the exterior of the fuselage, such that each frame is oriented orthogonal to the longitudinal axis and spaced apart from an adjacent frame; and irremovably attaching a plurality of intercostal ribs between pairs of adjacent frames of the plurality frames, such that each rib is oriented parallel to the longitudinal axis and attached to each of a pair of said adjacent frames. The method further comprises mounting equipment to or within the mounting structure; and covering the mounting structure and the equipment mounted thereon or therein with a cover. The method further comprises removably attaching the cover to the mounting structure or the fuselage. An assembly, structure, tailplane and aircraft are also provided.

21 Claims, 4 Drawing Sheets

(56) References Cited

U.S. PATENT DOCUMENTS

| | | |
|---|---|---|
| 4,034,939 A | 7/1977 | Ridley, Jr. et al. |
| 4,057,104 A | 11/1977 | Altoz |
| 5,096,142 A | 3/1992 | Rodriguez |
| 5,283,643 A | 2/1994 | Fujimoto |
| 5,929,816 A | 7/1999 | Gross et al. |
| 6,094,171 A | 7/2000 | Riddle et al. |
| 6,407,714 B1 | 6/2002 | Butler et al. |
| 8,063,837 B1 | 11/2011 | Jennings et al. |
| 10,476,296 B1 | 11/2019 | Rausch et al. |
| 10,557,934 B1 | 2/2020 | Billsberry et al. |
| 2008/0246670 A1 | 10/2008 | Vlad et al. |
| 2016/0068254 A1 | 3/2016 | Nakashima |
| 2016/0229536 A1* | 8/2016 | Aull ................. B64D 13/00 |
| 2017/0118873 A1 | 4/2017 | Szarek |
| 2017/0320591 A1 | 11/2017 | Tabuteau et al. |
| 2018/0351243 A1 | 12/2018 | Lewis et al. |
| 2019/0162268 A1 | 5/2019 | Chang et al. |

FOREIGN PATENT DOCUMENTS

| | | | |
|---|---|---|---|
| EP | 2 100 811 A2 | 9/2009 | |
| EP | 2 502 828 A1 | 9/2012 | |
| EP | 3 239 038 A1 | 11/2017 | |
| KR | 10-1092752 A1 | 12/2011 | |

OTHER PUBLICATIONS

U.S. Appl. No. 16/897,876, filed Jun. 10, 2020, Pursey et al.
Great Britain Combined Search and Examination Report dated Nov. 25, 2019 for Great Britain Application No. GB1908241.1; 6 Pages.
Great Britain Combined Search and Examination Report dated Nov. 15, 2019 for Great Britain Application No. GB1908238.7; 5 Pages.
U.S. Non-Final Office Action dated Jan. 13, 2022 for U.S. Appl. No. 16/897,876; 14 Pages.
Great Britain Examination Report dated Sep. 3, 2021 for Great Britain Application No. 1908241.1; 4 Pages.
Response to U.S. Non-Final Office Action dated May 20, 2022 for U.S. Appl. No. 16/897,876; Response filed Jul. 22, 2022; 11 Pages.
U.S. Notice of Allowance dated Aug. 22, 2022 for U.S. Appl. No. 16/897,876; 7 Pages.
U.S. Non-Final Office Action dated May 20, 2022 for U.S. Appl. No. 16/897,876; 10 Pages.

* cited by examiner

METHODS AND ASSEMBLIES FOR MOUNTING EQUIPMENT TO AN AIRCRAFT FUSELAGE

This application claims priority to UK Patent Application No. 1908238.7 filed on Jun. 10, 2019 in the UK Intellectual Property Office, the entire disclosure of which is incorporated herein by reference.

FIELD OF THE INVENTION

The present invention relates to a method of mounting equipment to an aircraft, and in particular mounting equipment to an aircraft's fuselage. In one aspect, the invention relates to a method of mounting equipment to an underside of the fuselage. An equipment assembly is also provided, along with a structure for an aircraft for attaching the equipment assembly. A fuselage comprising the structure for attaching the equipment assembly is also provided, and an aircraft comprising the structure for attaching the equipment assembly is also provided.

BACKGROUND

Equipment such as sensors, recording equipment and electronic equipment or systems, including electronic circuits can be added to the exterior of an aircraft as circumstances dictate. A well-known measure to add equipment is via a removable equipment compartment or 'pod' that is typically mountable to an underside of an aircraft's fuselage. However, such removable equipment pods are not always optimal in terms of strength or equipment performance. For example, the load that can be borne by a removable pod is limited and often precludes the use of such compartments for certain equipment.

U.S. Publication No. 2008/0246670 A discloses equipment directly mounted to the fuselage and protected by an external cover. U.S. Pat. No. 6,094,171 A discloses a removable equipment pod for an aircraft which has an exterior conductive wall with a tapered notch for certain kinds of equipment.

There is thus a need for a simple way to attach equipment to the exterior of an aircraft whilst maximizing ease of installation and available space for the equipment without adversely affecting its performance. There is also a need to mount larger loads in locations where typically such loads have not been possible.

SUMMARY OF THE INVENTION

In a first aspect, a method is provided of mounting equipment to an aircraft. The method comprises attaching a mounting structure to the fuselage of the aircraft. Typically, the fuselage extends lengthwise along a longitudinal axis, which is the axis about which an aircraft will roll, and orthogonal to the axes about which the aircraft will pitch or yaw. The step of attaching the mounting structure comprises irremovably attaching a plurality of substantially planar frames to the exterior of the fuselage, such that each frame is oriented orthogonal to the longitudinal axis and spaced apart from an adjacent frame. In the present case, an irremovable attachment is one in which the frames cannot be readily detached, in a non-destructive manner, from the fuselage structure (including parts coupled to the fuselage to facilitate attachment). That is, if permanent modifications are made to the fuselage structure (including parts coupled to the fuselage to facilitate attachment) in order to attach the frames, then the attachment is an irremovable one.

The method further comprises irremovably attaching a plurality of intercostal ribs between pairs of adjacent frames of the plurality frames, such that each rib is oriented parallel to the longitudinal axis and attached to each of a pair of said adjacent frames. In preferred embodiments each pair of adjacent frames has a pair of intercostal ribs extending there between—one at each end of the frame. The method further comprises mounting equipment to or within the mounting structure and finally covering the mounting structure and the equipment mounted thereon or therein with a cover, and removably attaching the cover to the mounting structure or the fuselage. Consistent with the definition of 'irremovable' above, a 'removable' attachment is one in which the cover can be readily detached, in a non-destructive manner, from the mounting structure or fuselage, which does not require permanent modifications to be made to either the mounting structure or fuselage (including parts coupled to the mounting structure or fuselage to facilitate attachment) to attach the cover.

In one embodiment, the method comprises forming a plurality of compartments, each compartment defined by a pair of adjacent frames and a pair of opposing intercostal ribs attached to each of the pair of adjacent frames. The compartments can be sized as appropriate, depending on the size of the cargo to be accommodated. Preferably, mounting equipment to or within the mounting structure comprises mounting equipment to a mounting surface within one or more of the plurality of compartments.

In one embodiment, the step of attaching the mounting structure to the fuselage comprises attaching one or more brackets (preferably at least two) to each frame, and further comprises attaching said one or more brackets to the fuselage. The brackets may be attached at any location on the fuselage, but preferably are attached to a frame member, former or bulkhead of the fuselage.

Preferably the step of attaching the one or more brackets to the frame member or bulkhead of the fuselage comprises passing one or more fasteners through each of the one or more brackets to a corresponding one or more fastening sites in the frame member, former or bulkhead.

Preferably one, at least one, some or all of the plurality of frames has an opening or aperture positioned between two outer portions. This opening facilitates containment of particularly lengthy or large loads which need to extend between or through two or more compartments, for example. In the case of these kinds of frames, the step of irremovably attaching the frames comprises attaching the two outer portions of each frame to the fuselage, for example by virtue of brackets mounted on the outer portions.

In some embodiments, the method further comprises irremovably attaching a plurality of substantially planar frames, different from the frames mentioned above, to the exterior of the fuselage such that each frame is oriented at an angle to the longitudinal axis and to the orthogonal planes mentioned above. By placing frames at an angle to the others, additional strength is provided to the relevant part of the assembly by enabling forces to be distributed differently.

Preferably the cover comprises an aerodynamic fairing. In that case, the step of removably attaching the cover comprises removably attaching the fairing to the mounting structure or the fuselage. As mentioned above, consistent with the definition of 'irremovable' above, a 'removable' attachment is one in which the fairing can be readily detached, in a non-destructive manner, from the mounting structure or fuselage, which does not require permanent modifications to be made to either the mounting structure or fuselage (including parts coupled to the mounting structure or fuselage to facilitate attachment) to attach the fairing.

In a second aspect of the invention, an equipment assembly for attaching to a fuselage of an aircraft is provided. The mounting structure preferably comprises a plurality of substantially planar frames irremovably attached or attachable to the exterior of the fuselage, such that each frame is oriented orthogonal to the longitudinal axis and spaced apart from an adjacent frame. The assembly further comprises a plurality of intercostal ribs irremovably attached or attachable between pairs of adjacent frames of the plurality frames, such that each rib is oriented parallel to the longitudinal axis and attached to each of a pair of said adjacent frames. The assembly further comprises a cover removably attached or attachable to the mounting structure or fuselage, and configured to cover the mounting structure and equipment mounted therein.

Preferably, the assembly further comprises a plurality of compartments. Each compartment is defined by a pair of adjacent frames and a pair of opposing intercostal ribs attached to each of the pair of adjacent frames. Preferably, the ribs are attached at opposing ends of each frame.

Preferably, the assembly further comprises a mounting surface within one or more of the plurality of compartments. The mounting surface may be additional to or the same as the frames, and ribs, and is used to mount equipment to the mounting assembly.

Preferably the mounting structure further comprises one or more brackets attached or attachable to each frame, each bracket being attached or attachable to the fuselage. Each bracket is preferably attached or attachable to a frame member, former or bulkhead of the fuselage. For example, each bracket may be attached to the frame member or bulkhead of the fuselage using one or more fasteners passing or configured to pass through each of the one or more brackets to a corresponding one or more fastening sites in the frame member, former or bulkhead.

Preferably each frame has an opening or aperture positioned between two outer portions. The opening or aperture facilitates containment of particularly lengthy or large loads which need to extend between or through two or more compartments, for example. In the case of these kinds of frames, the two outer portions of each frame are attached or attachable to the fuselage, for example by virtue of brackets mounted on the outer portions.

In some embodiments, the mounting structure further comprises a plurality of substantially planar frames irremovably attached or attachable to the exterior of the fuselage, such that each frame is oriented at an angle to the longitudinal axis and to the orthogonal planes. As mentioned above, by placing frames at an angle to the others, additional strength is provided to the relevant part of the assembly by enabling forces to be distributed differently.

Preferably the cover comprises an aerodynamic fairing, and is removably attached or attachable to the mounting structure or the fuselage.

Preferably the cover is configured to protect the aircraft and/or the mounting structure and/or equipment mounted within the mounting structure from lightning. To that end, the cover and/or the mounting structure may be made from or include a material that can conduct energy from a lightning strike into the aircraft structure, such as the fuselage, so that it can be safely dispersed without causing damage to the cover itself, the mounting structure and any equipment contained under the cover. Suitable materials are metal or a composite with a metallic mesh laid into it. Alternatively or additionally, lightning protection strips may be added to the exterior of the cover.

In a third aspect, a structure forming at least part of the fuselage of an aircraft is provided. The structure comprises an equipment assembly as described above attached to the exterior of the fuselage. Preferably the equipment assembly is attached to the underside of the fuselage.

In a fourth aspect, a fuselage or an aircraft is provided comprising the structure as mentioned above.

BRIEF DESCRIPTION OF THE DRAWINGS

The invention will now be described in detail with reference to the accompanying drawings, in which.

DETAILED DESCRIPTION

With reference to the drawings, there is shown a system for mounting equipment such as sensors, recording equipment and various electronic equipment or systems, including electronic circuits to the exterior of an aircraft. The system comprises a mounting structure 100. The mounting structure in this example takes the form of an external airframe which is irreversibly attached to an existing fuselage airframe 10. The mounting structure 100 in this example takes the form of a plurality of planar structural plates 102 (typically referred to as 'frames' in this art) spaced apart in a substantially parallel arrangement. The frames 102 can take the form of solid metal plates, or have a skeleton construction formed principally of struts (not shown) that provide strength and rigidity to the frames. Optionally, the struts may support a thinner plate. Each plate or frame is substantially rectangular, but it will be appreciated that each could be any suitable shape such as square, semi-circular, crescent or other polygon.

Each frame 102 at least partially or fully spans the width of the mounting structure 100. The width of the mounting structure 100 is perpendicular to the longitudinal axis, defined elsewhere herein. It will be appreciated that a frame 102 that fully spans the width of the mounting structure 100 will impart optimal strength and rigidity to the mounting structure 100, whereas a frame 102 that partially spans the width will offer greater flexibility in terms of capacity for equipment. As shown, one of the first plates 102a spans fully across the mounting structure 100 whereas other plates 102f and 102g only span partially the across mounting structure 100.

Further, as shown, some of plates or frames 102 provide a slot 103 which serves to both reduce the weight and provide space for cables and/or act as cradle/mount for equipment.

A first set of structural plates or frames 102 are substantially parallel to one another. However, the spacing between first adjacent plates can be varied as circumstances dictate. For example, the spacing between adjacent plates can be increased in accordance with the size of a given piece of equipment that may be stored therebetween. In essence, the spacing between adjacent first plates is fully customizable to accommodate a wide variety of equipment configurations.

In the example shown, the mounting structure 100 also comprises a plurality of intercostal ribs 104 wherein each rib 104 is substantially perpendicular and attached to an adjacent pair of frames 102 to provide support thereto. As with the frames 102, the intercostal ribs 104 can take the form of solid metal plates, or have a skeleton construction formed principally of struts (not shown) that provide strength and rigidity to the ribs. Optionally, the struts may support a thinner plate. Each plate or frame is substantially rectangular, but it will be appreciated that each could be any suitable shapes such as square, semi-circular, crescent or other polygon. The intercostal ribs may be connected to the frames via bolts, fasteners, rivets, brackets, welding, or any other suitable attachment.

In the example shown, the forward region 106 of the mounting structure 100 is formed of a further plurality of plates 108 that are cross-braced with one another. This provides a region of increased strength with respect to the remainder of the mounting structure. The skilled person will appreciate that the strength of a region can be increased in various ways, such as by using stronger materials, thicker materials, shorter section plates in higher density, and so on.

Together the frames 102 and intercostal ribs 104 define a mounting structure 100 with an overall volume comprising a number of sub-volumes or compartments 110. Each compartment 110 can be used to mount an item of equipment that is self-contained or equipment that forms part of a distributed system. The equipment could be attached directly to an outer surface of the frames 102 or ribs 104. Alternatively or additionally, the equipment may be supported on a mounting surface (not shown) such as shelf or base member that is attached to the frames 102 or ribs 104. Cables can be routed to/from the equipment throughout the mounting structure and to other parts of the aircraft such as the cockpit, cabin or avionics bays.

In the example shown, upper edges or regions of the frames 102 are attached to structural members 112 of the fuselage 10. For example, the frames 102 may be irremovably attached to fuselage hoop frames, formers or bulkheads of the airplane fuselage. The intercostal ribs 104 are indirectly attached to the aircraft fuselage via direct irremovable attachment to an adjacent pair of frames 104. The irremovable connection of the frames to the existing aircraft fuselage 10 can be achieved via bolts, fasteners, rivets, brackets, welding, or other suitable attachment passing through brackets 114 that are attached to both the frames and the fuselage.

Figure 1:
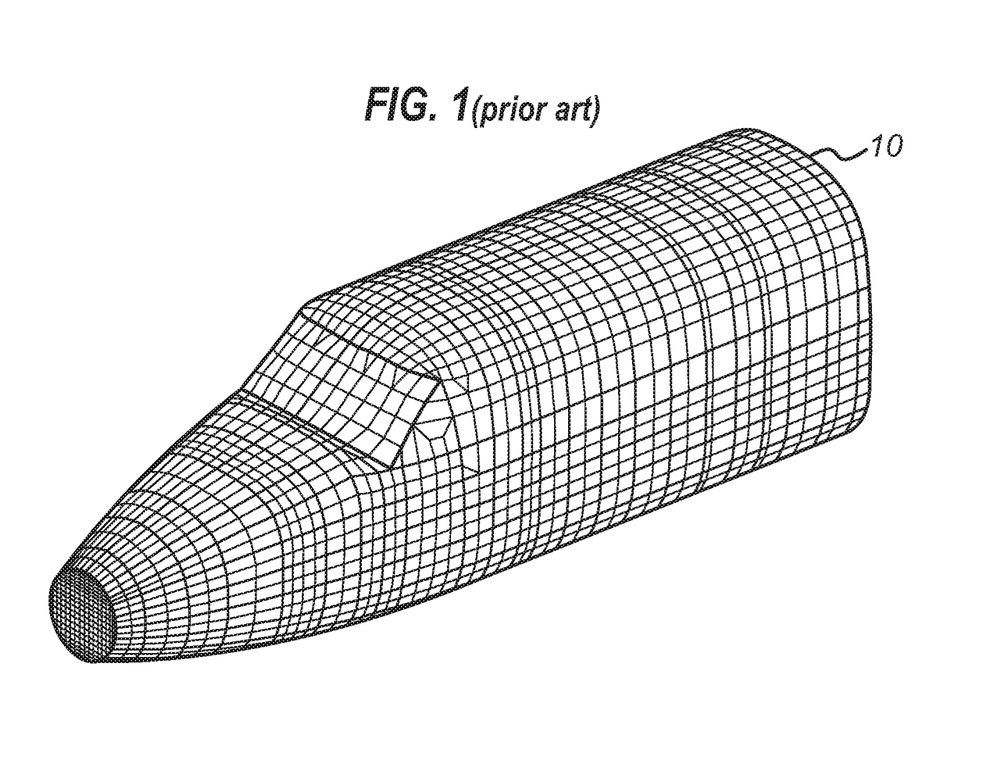
FIG. 1 shows a perspective view of a forward part of an aircraft fuselage.
Figure 2:
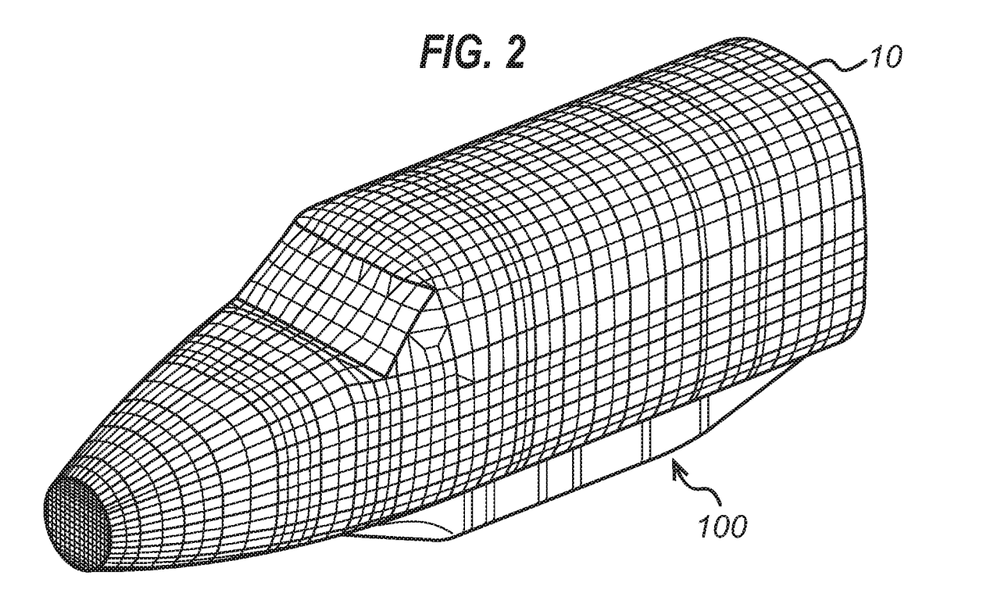
FIG. 2 shows a perspective view of a forward part of an aircraft fuselage to which an assembly according to the present invention is attached.
Figure 3:
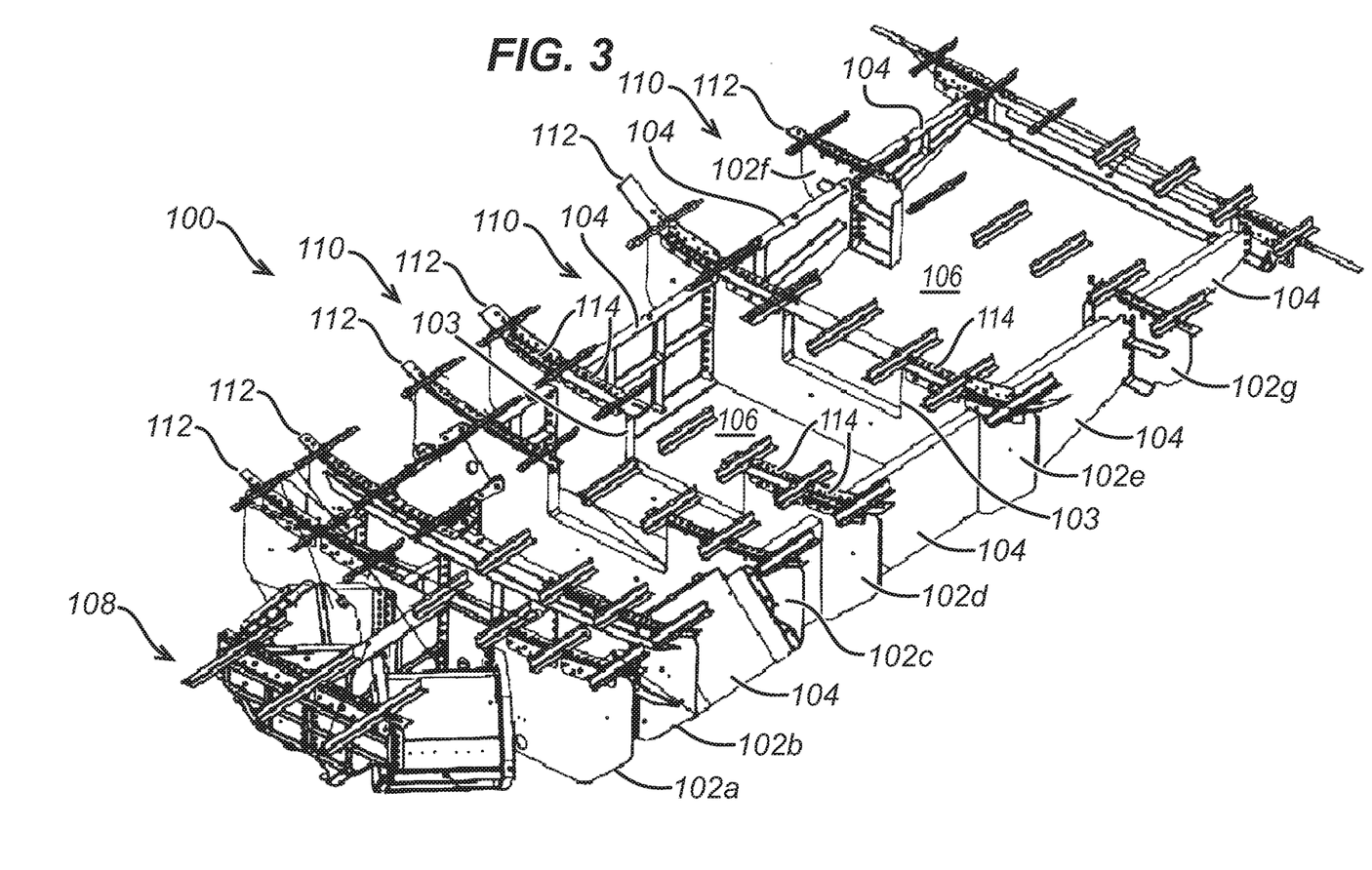
FIG. 3 shows a perspective view of the structure in FIG. 2 without a cover attached.
Figure 4:
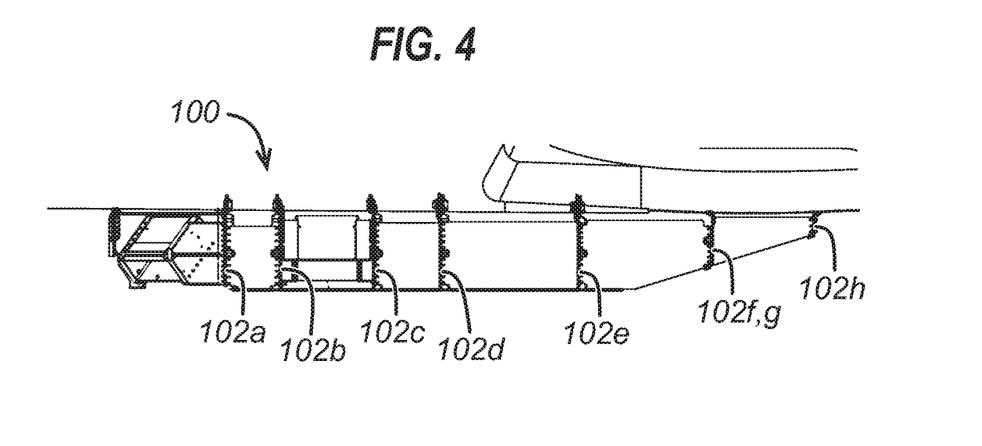
FIG. 4 shows a side view of the structure of FIG. 3.
Figure 5:
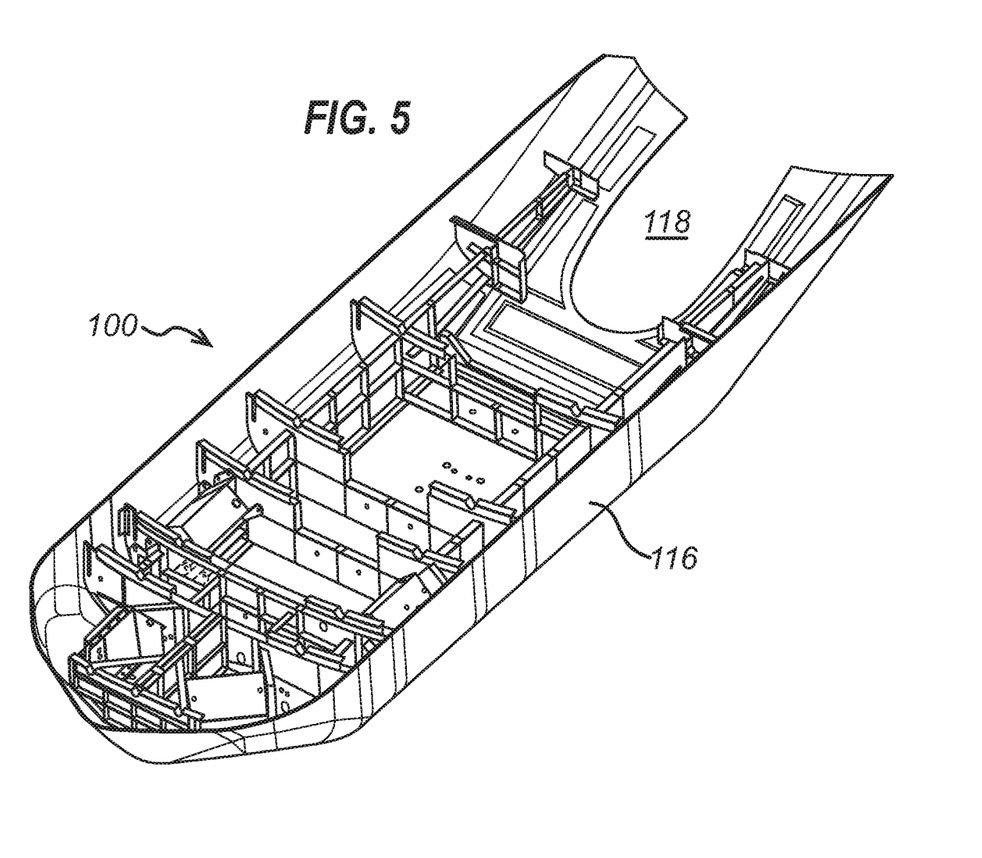
FIG. 5 shows a perspective view of the structure of FIG. 2 with a cover attached.

As shown, upper edges or regions of the frames 102 are shaped to conform to the fuselage 10 to which they are attached. The lower edges or regions of the frames 102 may also shaped in a way to minimize adverse effects on the aircraft's aerodynamic performance, such as aerodynamic drag. Furthermore, as shown in FIG. 4, the height of the frames 102 can be reduced as the frames approach the front and/or rear of the assembly 100. In other words, as shown, the height of frame $102h$ is less than frame $102f,g$ which is less than frame $102e$. This enables the assembly to taper, which can minimize adverse effects on the aircraft's aerodynamic performance.

Although in the example shown the mounting structure is connected to an underside of the airframe of the aircraft's fuselage 10, in principle the mounting structure can be connected anywhere on the airframe of the aircraft (e.g. one or both wings or the upper side of the airframe of the aircraft's fuselage). Moreover, a plurality of mounting structures can be connected anywhere on the airframe of the aircraft (e.g. any number of structures aligned between the fore and aft of an underside or upper side of the airframe of the aircraft's fuselage, or a pair of mounting structures on opposing sides of the fuselage, with each mounting structure being connected either to a lateral side of the fuselage between the upper and the underside, or to a wing).

As should be evident from the above, it is readily apparent that the exact dimensions and shape of the first and second structural plates of the mounting structure can be varied to account for a number of variables including the size and shape of the aircraft, the location on the aircraft to which it is attached, the overall volume the mounting structure defines, number and size of sub-volumes therein, and the aerodynamic performance of the aircraft. In the example shown, the mounting structure is between 1 m and 5 m; preferably between 2 m and 4 m; more preferably between 2.5 m and 3 m in length; between 0.5 m and 3 m; preferably between 0.75 m and 2 m; more preferably between 1 m and 1.5 meters in width; and between 0.4 m and 1.2 m; preferably between 0.5 m and 1 m; more preferably between 0.6 m and 0.8 m in height. Of course, these dimensions are purely exemplary for a typical aircraft and could be bigger or small depending on the application. The frames and intercostal ribs are made from aluminum, but may be made from any suitable metal, including titanium, or conductive material, or a carbon fibre material or composite material or reinforced plastics material.

Due to the construction of the mounting structure, and its connection to the fuselage of the aircraft, the mounting structure airframe is in effect part (or at least an extension) of the airframe of the aircraft. This means that the mounting structure can take advantage of the strength and support provided by the fuselage of the aircraft. For example, any loads that are placed in the mounting structure can in effect be distributed to the aircraft. Similarly, an electrical ground plane in the mounting structure can be common to one formed using the entire aircraft's outer surface. Thus, the provision of an electrical ground plane in the mounting structure is not constrained by the volume of the mounting structure, and has instead access to one many times larger. This represents significant improvements over existing removable equipment pods whose strength is constrained both by the design of the pod and the predefined attachment points to an aircraft.

Once the mounting structure 100 is attached to an aircraft fuselage, a cover 116 is provided to conceal the mounting structure 100 and the equipment (not shown) mounted therein or thereon. The cover 116 in this example is an aerodynamic fairing which is designed to minimize the drag of the mounting structure on fuselage.

The cover is 116 removably attachable to either the mounting structure 100 or the fuselage 10, or both. This allows access for servicing, removal of equipment, addition of equipment, replacement of equipment with either equivalent of different equipment and so on.

Thus, a method of mounting equipment to an aircraft is provided, along with an assembly, structure and aircraft for use with the method. A given piece of equipment may be mounted to the mounting structure, which indirectly attaches the equipment to an existing aircraft structure such as a fuselage. The strength and rigidity of the attachment is improved compared with removable pods and other such systems.

The method and the mounting structure are versatile in that the desired configuration and spacing of the equipment set can be chosen depending on the overall volume required by the equipment to be mounted in the mounting structure. Thus, the dimensions, shapes, and location of each of the frames and intercostal ribs can be configured in advance for optimal containment of the equipment, with the resulting structure providing better space and strength for a variety of loads.

Figure 6:
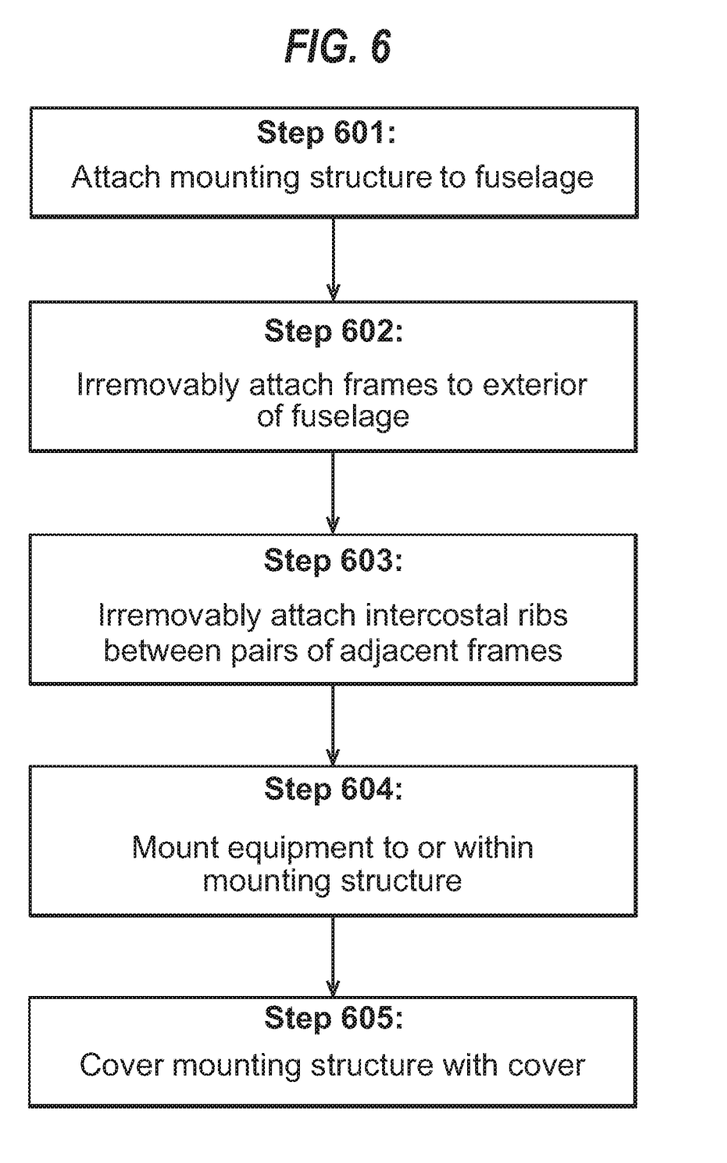
FIG. 6 shows a flow diagram of a method according to the present invention.

As described elsewhere herein, the frames 102 and intercostal ribs 104 are irreversibly attached to the fuselage 10 of the aircraft (steps 601 to 603) either directly (in the case of the frames) or indirectly (in the case of the ribs). For example, the frames 102 may be directly connected to the aircraft via their upper edges or regions (step 602). The ribs 104 may be directly connected to adjacent pairs of frames 102 as required (step 603).

Once the frames 102 and ribs 104 are in place, the equipment (not shown) may then be attached to or within the mounting structure 100 using customized shelves and/or slots (not shown) as need be (step 604). Cables to/from each piece equipment within the mounting structure and from/to the rest of the aircraft, such as the cockpit, cabin or avionics bays, may be routed through the mounting structure 100 and connected to the aircraft and equipment as required.

Finally, an aerodynamic fairing or other cover 116 may be placed over the mounting structure 100 and the equipment (not shown) and reversibly connected to the mounting structure 100 or fuselage 10 as required (step 605). As mentioned elsewhere herein, the aerodynamic fairing can be removed for servicing, or to accommodate new/updated pieces of equipment. The fairing may have a closable or permanent opening 118 to permit equipment to have an unimpeded view of the external environment, or to permit equipment to vacate the mounting structure 100, as desired.

In terms of equipment which may be placed in the mounting structure 100, a variety of uses are particularly advantageous. In particular, the mounting structure may be configured to contain sensors, equipment that may be launched from the mounting structure such as drones, and so on. Due to its increased capacity for load, and ease of access to the external environment, the mounting structure may contain or be configured to contain equipment for search and rescue applications, such as cameras, hoists, winches, stretchers and so on. The mounting structure 100 may contain or be configured to contain equipment for surveying or weather monitoring, such as cameras, sensors, and suchlike.

It will be appreciated that, in use, the mounting structure 100 is unpressurised and unheated, such that when the aircraft is flying, for example at cruise altitude, it would be particularly advantageous to use it to provide a low temperature and low pressure environment, very close to ambient. This facilitates the use of the mounting structure 100 to contain equipment that requires a low temperature or low pressure environment to operate, and/or is not capable of being actively cooled and therefore benefits from passive cooling from the surrounding environment. Such equipment may include high powered and/or acoustically noisy equipment, which may include avionics equipment, power converters or amplifiers that may operate with high power and therefore generate high temperatures during operation; or temperature sensing equipment that needs to operate frequently at sub-zero (deg C.) temperatures.

Depending on the precise location of the mounting structure 100, it may be particularly advantageous to use it for storage of equipment to benefit the loading and/or balance of the aircraft. For example, where an aircraft may be loaded with significant weight toward the rear of the fuselage, a mounting structure 100 positioned toward the nose may act as a counterbalance.

It will be appreciated that because the mounting structure 100 is external to the fuselage and thus isolated from the interior and the avionic systems contained therein, it would be particularly advantageous to use it to contain equipment that is either electrically sensitive (and would therefore be undesirably influenced by the electronic systems within the fuselage) or electrically noisy (and would therefore undesirably influence the aircraft systems within the fuselage). Thus, the mounting structure 100 offers versatility to adjust the location of different systems to optimize their Electromagnetic Compatibility (EMC) and/or to isolate radiated emissions from inside or outside the aircraft. For example, it would be possible to locate the mounting structure 100 on the fuselage as far away from the rest of the platform avionics systems as possible to reduce the risk of EMC interference.

It will be appreciated that because the mounting structure 100 is adjacent many aircraft systems and structures, such as the cockpit, wings, engines, landing gear and so on, it would be particularly advantageous to use it for datalogging equipment for measuring and/or and recording parameters related to the fuselage, control surfaces and flaps on the wings, engines and landing gear, for the purposes of testing and evaluation.

According to the invention, a mounting structure has been provided that offers improved versatility and load carrying capabilities compared with the removable 'pods' of the prior art.

The invention claimed is:

1. A method of mounting equipment to an aircraft, the method comprising: attaching a mounting structure to the fuselage of the aircraft, the fuselage extending lengthwise along a longitudinal axis, wherein the step of attaching the mounting structure comprising:
   irremovably attaching a plurality of planar frames to the exterior of the fuselage, such that each of the planar frames is oriented orthogonal to the longitudinal axis and spaced apart from an adjacent frame; and
   irremovably attaching a plurality of intercostal ribs between pairs of adjacent frames of the plurality frames, such that each of the intercostal ribs is oriented parallel to the longitudinal axis and attached to each of a pair of said adjacent frames;
   mounting equipment to or within the mounting structure; and
   covering the mounting structure and the equipment mounted thereon or therein with a cover, and removably attaching the cover to the mounting structure or the fuselage.

2. The method of claim 1, further comprising forming a plurality of compartments, each compartment defined by a pair of adjacent frames and a pair of opposing intercostal ribs attached to each of the pair of adjacent frames.

3. The method of claim 2, wherein the step of mounting equipment to or within the mounting structure comprises mounting equipment to a mounting surface within one or more of the plurality of compartments.

4. The method of claim 1, wherein the step of attaching the mounting structure to the fuselage comprises attaching one or more brackets to each of the planar frames, and further comprises attaching said one or more brackets to the fuselage.

5. The method of claim 4, wherein the step of attaching said one or more brackets to the fuselage comprises attaching said one or more brackets to a frame member, former or bulkhead of the fuselage.

6. The method of claim 5, wherein the step of attaching the one or more brackets to the frame member or bulkhead of the fuselage comprises passing one or more fasteners through each of the one or more brackets to a corresponding one or more fastening sites in the frame member, former or bulkhead.

7. The method of claim 1, wherein each of the planar frames has an opening or aperture positioned between two outer portions, and wherein the step of irremovably attaching the planar frames comprises attaching the two outer portions of each frame to the fuselage.

8. The method of claim 1, wherein the step of attaching the mounting structure further comprises irremovably attaching a plurality of the planar frames to the exterior of the fuselage, such that each of the planar frames is oriented at an angle to the longitudinal axis and to the orthogonal planes.

9. The method of claim 1, wherein the cover comprises an aerodynamic fairing, and wherein the step of removably attaching the cover comprises removably attaching the fairing to the mounting structure or the fuselage.

10. An equipment assembly for attaching to a fuselage of an aircraft, the equipment assembly comprising:
   a mounting structure, wherein the mounting structure comprises a plurality of planar frames irremovably attached or attachable to the exterior of the fuselage, such that each frame is oriented orthogonal to the longitudinal axis and spaced apart from an adjacent frame; and
   a plurality of intercostal ribs irremovably attached or attachable between pairs of adjacent frames of the plurality frames, such that each rib is oriented parallel to the longitudinal axis and attached to each of a pair of said adjacent frames; and
   a cover removably attached or attachable to the mounting structure or fuselage, and configured to cover the mounting structure and equipment mounted therein.

11. The assembly of claim 10, further comprising a plurality of compartments, each compartment defined by a pair of adjacent frames and a pair of opposing intercostal ribs attached to each of the pair of adjacent frames.

12. The assembly of claim 11, further comprising a mounting surface within one or more of the plurality of compartments.

13. The assembly of claim 10, wherein the mounting structure further comprises one or more brackets attached or attachable to each of the planar frames, each bracket being attached or attachable to the fuselage.

14. The assembly of claim 13, wherein each bracket is attached or attachable to a frame member, former or bulkhead of the fuselage.

15. The assembly of claim 14, each bracket is attached to the frame member or bulkhead of the fuselage using one or more fasteners passing or configured to pass through each of the one or more brackets to a corresponding one or more fastening sites in the frame member, former or bulkhead.

16. The assembly of claim 10, wherein each of the planar frames has an opening or aperture positioned between two outer portions.

17. The assembly of claim 16, wherein each bracket is attached or attachable to an outer portion of a frame.

18. The assembly of claim 10, wherein the mounting structure further comprises a plurality of planar frames irremovably attached or attachable to the exterior of the fuselage, such that each of the planar frames is oriented at an angle to the longitudinal axis and to the orthogonal planes.

19. The assembly of claim 10, wherein the cover comprises an aerodynamic fairing, and is removably attached or attachable to the mounting structure or the fuselage.

20. The assembly of claim 10, wherein the cover is configured to protect the aircraft and/or the mounting structure and/or the equipment mounted within the mounting structure from lightning.

21. The assembly of claim 20, wherein the cover and/or the mounting structure is made from a conductive material, such as metal, that is capable of conducting energy from a lightning strike into the plinth and/or aircraft structure, preferably the fuselage.

* * * * *